(12) United States Patent
Jamali Rad et al.

(10) Patent No.: US 11,150,365 B2
(45) Date of Patent: Oct. 19, 2021

(54) METHOD, SEISMIC SENSOR AND SYSTEM FOR WIRELESS SEISMIC NETWORKING

(71) Applicant: SHELL OIL COMPANY, Houston, TX (US)

(72) Inventors: Hadi Jamali Rad, Rijswijk (NL); Xander Campman, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 201 days.

(21) Appl. No.: 16/483,585

(22) PCT Filed: Feb. 6, 2018

(86) PCT No.: PCT/US2018/017023
§ 371 (c)(1),
(2) Date: Sep. 9, 2019

(87) PCT Pub. No.: WO2018/148190
PCT Pub. Date: Aug. 16, 2018

(65) Prior Publication Data
US 2019/0383958 A1    Dec. 19, 2019

(30) Foreign Application Priority Data
Feb. 8, 2017    (EP) .................................... 17155229

(51) Int. Cl.
*G01V 1/00* (2006.01)
*G01V 1/22* (2006.01)
*H04W 4/38* (2018.01)
*H04W 4/18* (2009.01)

(52) U.S. Cl.
CPC .............. *G01V 1/003* (2013.01); *G01V 1/223* (2013.01); *H04W 4/18* (2013.01); *H04W 4/38* (2018.02)

(58) Field of Classification Search
CPC ......... G01V 1/003; G01V 1/223; H04W 4/38; H04W 4/18
See application file for complete search history.

(56) References Cited

U.S. PATENT DOCUMENTS

| | | | |
|---|---|---|---|
| 6,832,251 B1 | 12/2004 | Gelvin et al. | |
| 8,004,933 B2 | 8/2011 | Iseli | |
| 10,107,926 B1* | 10/2018 | Elder | G01V 1/24 |
| 2007/0110105 A1* | 5/2007 | Usuki | H04N 21/2365 |
| | | | 370/487 |
| 2008/0049554 A1 | 2/2008 | Crice et al. | |

(Continued)

FOREIGN PATENT DOCUMENTS

KR    20150018215 A    2/2015

OTHER PUBLICATIONS

"Narrowband IoT", Retrieved from Wikipedia URL: https://en.wikipedia.org/wiki/Narrowband_IoT, 2 pages.

(Continued)

*Primary Examiner* — Philip J Chea
*Assistant Examiner* — Hassan A Khan
(74) *Attorney, Agent, or Firm* — Shell Oil Company

(57) ABSTRACT

The present invention disclosure is directed to a method, seismic sensor and system for wireless seismic networking. The system may comprise a low-power wide-area network (LPWAN) including wireless seismic sensors, the LPWAN being established for wireless transmission of data from the wireless seismic sensors.

19 Claims, 6 Drawing Sheets

(56) References Cited

U.S. PATENT DOCUMENTS

| | | | |
|---|---|---|---|
| 2009/0261968 A1* | 10/2009 | El-Hamamsy | G01V 1/223 340/539.1 |
| 2011/0235627 A1* | 9/2011 | Wang | H04W 4/20 370/338 |
| 2011/0305114 A1 | 12/2011 | Golparian et al. | |
| 2015/0264626 A1 | 9/2015 | Perdomo | |
| 2016/0094270 A1* | 3/2016 | Seller | H04J 3/0608 375/139 |
| 2019/0386790 A1* | 12/2019 | Hawinkel | H04L 1/1887 |

OTHER PUBLICATIONS

"The Mobile Broadband Standard", 3GPP Global initiative, Progress on 3GPP IoT, 2 pages.
Prajzler, "LoRa, LoRAWAN and Loriot. io", LoRa Gateways and Concentrators, LoRAWAN Beta, Aug. 2015, 3 pages.
LoRa, Wikipedia, 4 pages.
LPWAN, Wikipedia, 3 pages.
International Search Report and Written Opinion received for PCT Patent Application No. PCT/US2018/017023, dated May 23, 2018, 9 pages.
Farrell, "LPWAN Overview", Draft-farrell-lpwan-overview-04, IETF, Oct. 31, 2016, pp. 1-35.

\* cited by examiner

METHOD, SEISMIC SENSOR AND SYSTEM FOR WIRELESS SEISMIC NETWORKING

CROSS REFERENCE TO RELATED APPLICATIONS

This is a national stage application of International Application No. PCT/US2018/017023, filed 6 Feb. 2018, which claims benefit of priority of European application No. 17155229.2, filed 8 Feb. 2017.

FIELD OF THE INVENTION

The present invention generally relates to seismic networks, and more particularly, to a method, sensor and system for wireless seismic networking.

BACKGROUND

Active seismic exploration may involve surveying subterranean geological formations for hydrocarbon deposits by deploying seismic sources and seismic sensors.

The seismic sources are used to generate seismic waves, which propagate into the geological formations, creating pressure changes and vibrations along the way. Changes in properties of the geological formations scatter the seismic waves, changing physical parameters of the waves, including the direction of propagation of the waves.

The seismic sensors convert changes in the measured physical parameters into electrical signals that can be digitized, processed and/or interpreted, which electrical signals include seismic data.

Depending on the survey environment, the sensors used in the seismic survey may be geophones which measure earth movement, hydrophones which measure pressure waves (i.e. sound), or accelerometers which measure the acceleration of particles in water or earth.

Besides active seismic explained earlier, passive seismic methods do not use active human-built sources, but look for natural seismic sources in the subsurface and detect natural low frequency earth movements, such as micro-seismic phenomena or earthquakes.

Both active and passive seismic are usually for the purpose of discerning geological structure and locate underground oil, gas, or other resources.

It is typical to provide each seismic sensor with a memory to store generated seismic data, which needs to be transmitted to a fusion center (FC) or server for processing and decision making.

In traditional seismic surveys, seismic sensors are connected to each other and to data-collecting devices via twisted pair cables in order to transmit generated seismic data. Such wired systems are reasonably steady for data transmission if properly engineered. However, they are also associated with some practical issues. For example, they are vulnerable to environmental effects, may create interference and destructive induction on neighboring cables. Also, cable-based seismic operations can be expensive due to number of crew involved, excessive weight of the cables for transportation, as well as complications involved in maintenance and retrieval.

At the same time, in seismic domain, wireless transmission of data might be a good choice for:

locations difficult to reach and roam in, such as deserts, jungles, and mountainous areas such as foothills and fold thrust belts;

temporary installations or surveys which are supposed to move to another location; and remote locations with limited or no power access through wires.

U.S. Pat. No. 8,004,933B2 discusses a seismic data acquisition apparatus delivering recorded data to a central recorder by manually retrieving removable memory from each such apparatus, by wireless transmission, or by transmission via cables, and is incorporated herein with its entirety by reference.

US Patent Application Publication No. 2011305114A discusses seismic survey communication systems and methods which may extend the range of wireless communications in a seismic acquisition survey by leveraging the infrastructure of a hardwired communications backbone by appending wireless cells to the hardwired communications, and is incorporated herein with its entirety by reference.

Taking these methods and systems into account, there are still a few technical problems which are not addressed:

1) wireless technologies employed in current seismic applications are typically short-range high data-rate solutions with high power consumptions and hence are not suitable for sensors powered by batteries. Those technologies are also expensive per module so are not preferred for large scale implementations;
2) the most suitable physical layer (PHY) technology should be appropriately selected based on the applications of the network.

SUMMARY OF THE INVENTION

Therefore, it might be advantageous to provide a solution which can address one or more of the aforementioned problems.

According to an aspect of the present invention, there is provided a system for wireless seismic networking, comprising: a low-power wide-area network (LPWAN) including wireless seismic sensors, the LPWAN being established for wireless transmission of data from the wireless seismic sensors.

LPWAN family can be divided into two subcategories. The first subcategory includes available LPWA technologies such as Sigfox and Long Range (LoRa) technology etc. which mainly operate in the unlicensed band. The second subcategory includes technologies developed by modifying cellular standards such as the third generation partnership program (3GPP) and long term evolution (LTE) specifically for Internet of Things (IoT) applications. The second subcategory may operate in the licensed band and include LTE-M, NB-IoT and Extended Coverage GSM (EC-GSM). It has been found by the inventors of the present invention disclosure that LoRa from the first subcategory and NB-IoT from the second subcategory can nicely fit in for wireless transmission of data from seismic sensors. The LPWAN is compatible with and configured to be connected to an existing wired or wireless backbone. The wired backbone may include fiber optic and/or DSL cables.

In an embodiment of the system, the data from the wireless seismic sensors may include continuous data and intermittent data, at least one of the wireless seismic sensors are configured to: transmit continuous data using a first data section of a frame; if there is intermittent data to be transmitted, transmit the intermittent data using a second data section of the frame; if there is no intermittent data to be transmitted, transmit additional continuous data using the second data section of the frame. In addition, the at least one of the wireless seismic sensors may be further configure to transmit, in a header of the frame, an indicator indicating if the second data section of the frame is used to transmit the intermittent data or the continuous data.

According to another aspect of the present invention, there is provided a seismic sensor for wireless seismic networking, comprising a LPWAN module for wireless transmission of data from the seismic sensor.

In an embodiment of the seismic sensor, the data may include intermittent data and continuous data, and the LPWAN module is configured to: transmit continuous data using a first data section of a frame; if there is intermittent data to be transmitted, transmit the intermittent data using a second data section of the frame; if there is no intermittent data to be transmitted, transmit additional continuous data using the second data section of the frame. In addition, the LPWAN module may be further configured to transmit, in a header of the frame, an indicator indicating if the second data section of the frame is used to transmit the intermittent data or the continuous data.

According to another aspect of the present invention, there is further provided a method for wireless seismic networking, comprising: providing seismic sensors each having a LPWAN module, the LPWAN module being configured for wireless transmission of data and intermittent data from the seismic sensor.

In an embodiment of the method, it further comprises performing the following steps by at least one of the seismic sensors: transmitting continuous data using a first data section of a frame; if there is intermittent data to be transmitted, transmitting the intermittent data using a second data section of the frame; if there is no intermittent data to be transmitted, transmitting additional continuous data using the second data section of the frame. In addition, the method may further comprises performing the following step by the at least one of the wireless seismic sensors: transmitting, in a header of the frame, an indicator indicating if the second data section of the frame is used to transmit the intermittent data or the continuous data.

The method, seismic sensor and system according to certain embodiments of the present invention disclosure may achieve the following advantages:

1) by gradually sending intermittent data along with the continuous data, it is possible to keep the required data-rate as low as possible and hence lower the power consumption and thus making it possible to use LPWA technologies which are cheap and offer only low data-rates;

2) by providing a uniformed frame structure for wireless transmission of both continuous data and intermittent data from wireless seismic sensors, it is ensured that the complexity of the system is relatively low;

3) the proposed solution is compatible with existing wireless and/or wired backbone such as gateways, wireless towers, networks servers.

BRIEF DESCRIPTION OF THE DRAWINGS

The drawings depict one or more implementations in accord with the present teachings, by way of example only, not by way of limitation. In the figures, like reference numerals refer to the same or similar elements.

Figure 1:
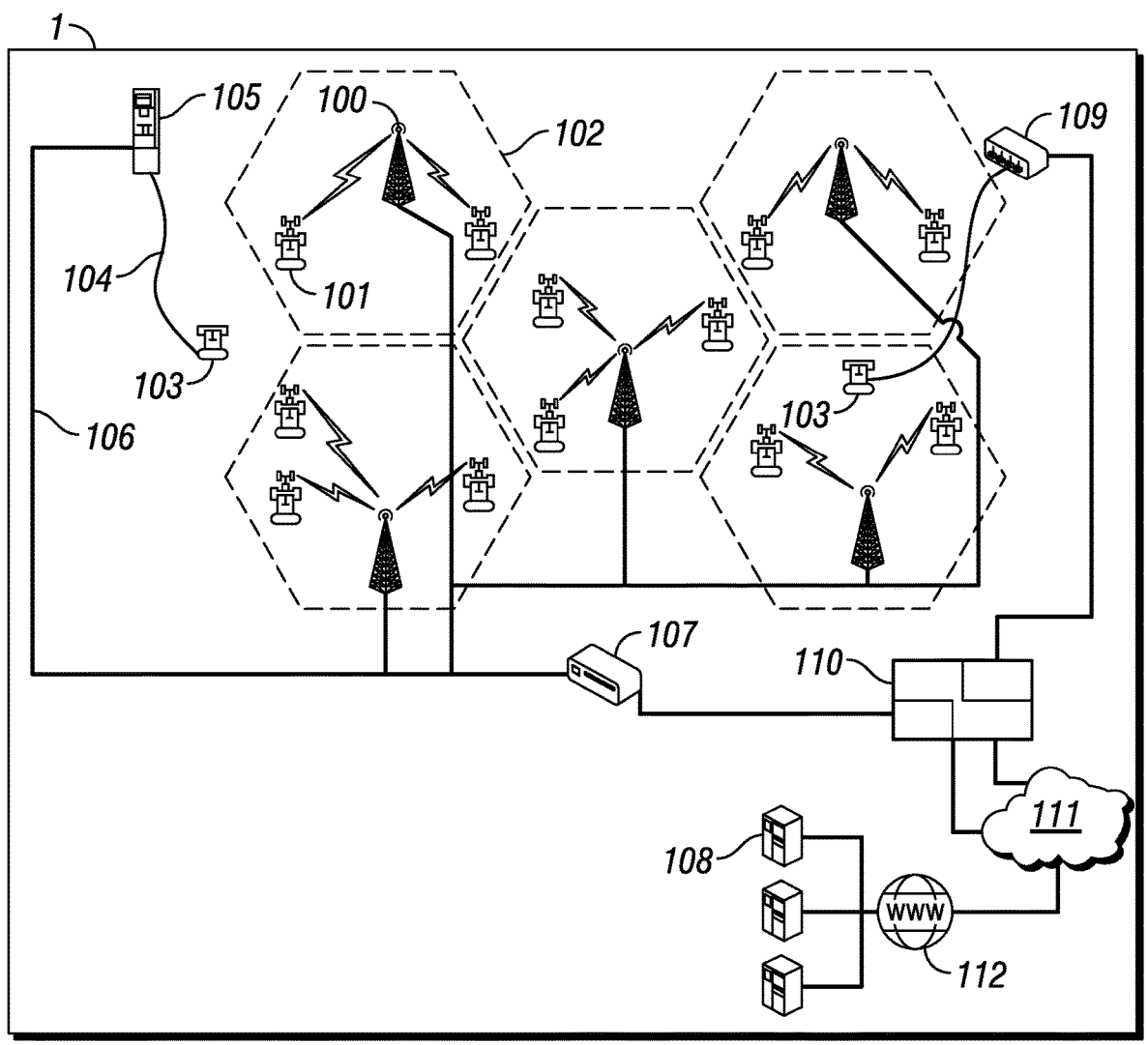
FIGS. 1-4 depict seismic systems according to certain embodiments of the present invention.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

The following examples of certain aspects of some embodiments are given to facilitate a better understanding of the present invention. In no way should these examples be read to limit, or define, the scope of the invention.

Four major scenarios in seismic applications will be introduced below.

1st Scenario: Ground Motion Monitoring (GMM)

GMM is an on-demand seismic operation in which seismic sensors such as geophones or accelerometers keep on observing signals but only start recording data when a considerable event (surpassing pre-defined threshold magnitude) happens. This leads to a trigger based on which the sensors start recording data and this data needs to be kept for later analysis or be transmitted for immediate actions in early-warning systems. Sometimes the sensors keep on recording and overwriting their readings for a period of time in their memory buffer and once they are triggered the data corresponding to a short time-span before and after the trigger are kept as useful data and/or transmitted. The size of data to be transmitted per sensor is a product of the number of triggers by the size of recorded data per trigger. The recorded data should have a good resolution (high sampling rate and high number of bits per sample) in order to ensure accurate source mechanism and source location estimation. However, such scenarios are not so demanding in terms of data generation/transmission because triggers do not happen very often. With regards to setup, such scenarios are typically comprised of a (few) hundreds-to-thousand sensors spread over an area of a few (hundreds of) kilometers squared. This means on average spacing of the adjacent sensors can be of order of 100's of meters which is a challenging parameter as far as wireless transmissions are concerned. The wireless network enables to efficiently transmit the triggered sensor data and thus make fast and appropriate decisions for alarming systems.

$2^{nd}$ Scenario: Ambient Noise Seismic Interferometry (ANSI)

ANSI utilizes the cross-correlations of signals at different sensor pairs to reconstruct the Green's functions of the subsurface between the sensor pairs. In practice, these cross-correlations should be computed over a long time (large span of continuous-time recordings) in order to converge to Green's functions. It means, in contrast to GMM and early warning systems, seismic interferometry requires the sensors to keep on recording their noise readings. These recordings should then be transmitted to an FC for creating maps and for the analysis of the subsurface. In certain embodiments, it may be preferred that this continuously recorded data can be transmitted in a real-time fashion or regularly for analysis and decision making. This highlights the importance of an appropriate wireless network design to efficiently handle the delivery of the data. The recorded noise can have a much lower resolution (i.e., lower sampling rate and lower number of bits per sample) comparing to the data generated/recorded in GMM. This fortunately keeps the data generation at a reasonably low rate. The challenge here is mostly due to the continuous recording and transmission of data. Regarding the setup, interferometry networks are typically dense networks containing thousand(s) of sensors deployed over a region of about many squared kilometers. As a result, spacing among neighboring sensors can be as large as few hundred meters up to about a kilometer.

$3^{rd}$ Scenario: Micro-Seismic Fracture Monitoring (MFM)

MFM provides important information about volumetric stress/strain and failure mechanisms in reservoirs and thus helps to analyze and affect the productivity level of wells using e.g. hydraulic fracturing. The area of interest for fracture monitoring typically extends to about a kilometer squared and sensors are normally placed every 50 to 100 meters depending how accurate moment tensors and location information of fractures should be estimated. What is recorded per sensor is the full trace data in a continuous fashion typically for a few hours. In some cases, sensors are only triggered when the hydraulic material is injected in order to create fractures. In such a case recorded data should be transmitted continuously or in a real-time fashion to be able to keep track of fracture extension. Nonetheless, from the data size (per sensor) perspective this scenario is relatively demanding. However, the total amount of data is not huge as the number of sensors is relatively low compared to the other scenarios of interest.

$4^{th}$ Scenario: Quality Control for Active Land Seismic Surveys (QCLS)

Active seismic surveys are huge undertakings. The area of an active seismic acquisition typically extends to few tens of kilometers in one direction and few kilometers in the other direction. Spacing of sensors along the sensor lines (in-line direction) is typically 12.5 m to 25 m and the spacing of sensor lines in the other (cross-line) direction is about 100 m. This means there can be tens of thousands to even hundred thousands of sensors in place. Active seismic acquisitions can take months or even a year. Acquisition crew need to control the quality of the acquisition through a few parameters every few shots, or on a daily basis. These parameters include RMS noise level per channel, RMS seismic noise level, geophone tilt, etc. It may be of high interest also if sensors can report quality control (QC) alerts, such as theft (based on significant change of their locations), or unexpected battery issues. Quite the opposite of the MFM, here the size of data per sensor is only a few bytes in the worst case whereas the number of sensors is huge. This besides relatively close spacing of sensors along the in-line direction necessitates a different approach for collecting, coordinating and transferring the data through a wireless network.

TABLE 1

Scenarios of Interest and features thereof

| Scenario | No. of sensors | Spacing | Area Covered | Type of data |
|---|---|---|---|---|
| GMM | 100-1,000 | 1-10 km | 100-1000 km$^2$ | intermittent |
| ANSI | 1,000-10,000 | 100-1,000 m | 1-100 km$^2$ | continuous |
| MFM | 100-500 | 50-100 m | 1 km$^2$ | Intermittent and/or continuous |
| QCLS | 100,000-500,000 | 10-200 m | 100-1000 km$^2$ | Intermittent and/or continuous |

Table 1 summarizes the main features of the four scenarios of interest discussed herein by showing the approximate number of sensors, their spacings, the intended area to cover, and the type(s) of data generated. In the four scenarios, there are mainly two types of data generated at the seismic sensors, including:

Continuous data: data continuously generated and recorded, including typically the noise data collected in ANSI, data generated in MFM.

Intermittent data: data generated when triggered by an event such as an earthquake, examples include data generated in GMM, QC alerts. Comparing to continuous data, intermittent data often requires higher data resolution but is more delay-tolerant.

It should be appreciated by those skilled in the art that if in a scenario of interest there is only one type of data (for instance continuous data for ANSI/MFM or intermittent data for GMM) being generated, this becomes a specific case of the general simultaneous stream and can be easily handled.

FIGS. 1-4 illustrate seismic systems according to certain embodiments of the present invention. In the depicted seismic systems, the appropriate wireless technology is selected by considering coverage, transceiver power consumption, price, data-rate, non-line-of-site (NLoS) mitigation capabilities, and interference resilience. To cope with transmission of both intermittent data and continuous data simultaneously, it is proposed to use LPWAN which offers a considerably long range (up to 15 km in line of site (LoS)), extremely long battery lifetime (about 10 years if the standard protocols are followed), and low, but still tolerable, data-rates (10 to 100 kbps). In other words, in the seismic systems depicted in FIGS. 1-4, a LPWAN including wireless seismic sensors is established for transmitting both continuous data and intermittent data from the wireless seismic sensors, in order to deliver the aforesaid features associated with LPWAN. As will be further described with reference to specific network infrastructures in the drawings, LoRa and NB-IoT appear to be predominant candidates when selecting the most suitable PHY technology.

The seismic system 1 in FIG. 1 is of large-scale and is particularly suitable to be deployed in areas where an established cellular-network infrastructure (e.g. wireless towers 100 each has a coverage area 102 and other backbone elements) exists. A LPWAN established in the seismic system 1 is compatible with and connected to the existing backbone.

If the area of interest is not so far from an existing cellular establishment, expanding the coverage of the network by creating edge cells and tapping into the capacity of the wireless backhaul may be an option. This, however, does not necessarily hold for regions lacking a proper cellular infrastructure, which is a limiting factor for this seismic system 1.

The considerably high capacity of the wireless towers 100 makes this system 1 flexible enough to scale up to thousands of wireless seismic sensors 101. Besides, the coverage area 102 of each wireless tower 100 is typically of order of tens of miles, which allows covering an immensely large area of interest.

Each wireless seismic sensor 101 in FIG. 1 may immediately communicate with a wireless tower 100 or with an intermediate Node-B (or wireless mast, not shown) to reach a wireless tower 100 in the backhaul network. From there on the data is forwarded through for example fiber optic 106 to a fiber optic switching center 107, a main gateway 110 and become available on the Internet 112 through the network server 111. In this embodiment, decision making, data processing may be done at the server side, e.g. at the application servers 108.

The seismic system 1 may also include one or more wired seismic sensors 103 connected to an existing wired backbone. As illustrated in FIG. 1, such wired seismic sensors 103 may be connected to a DSL Access Multiplexer (DSLAM) 109 or a fiber optic cabinet 105 via a DSL link 104. The backhaul data arriving at the cabinet 105 is further forwarded to the fiber optic switching center 107 and then to the main gateway 110 via DSL.

Figure 2:
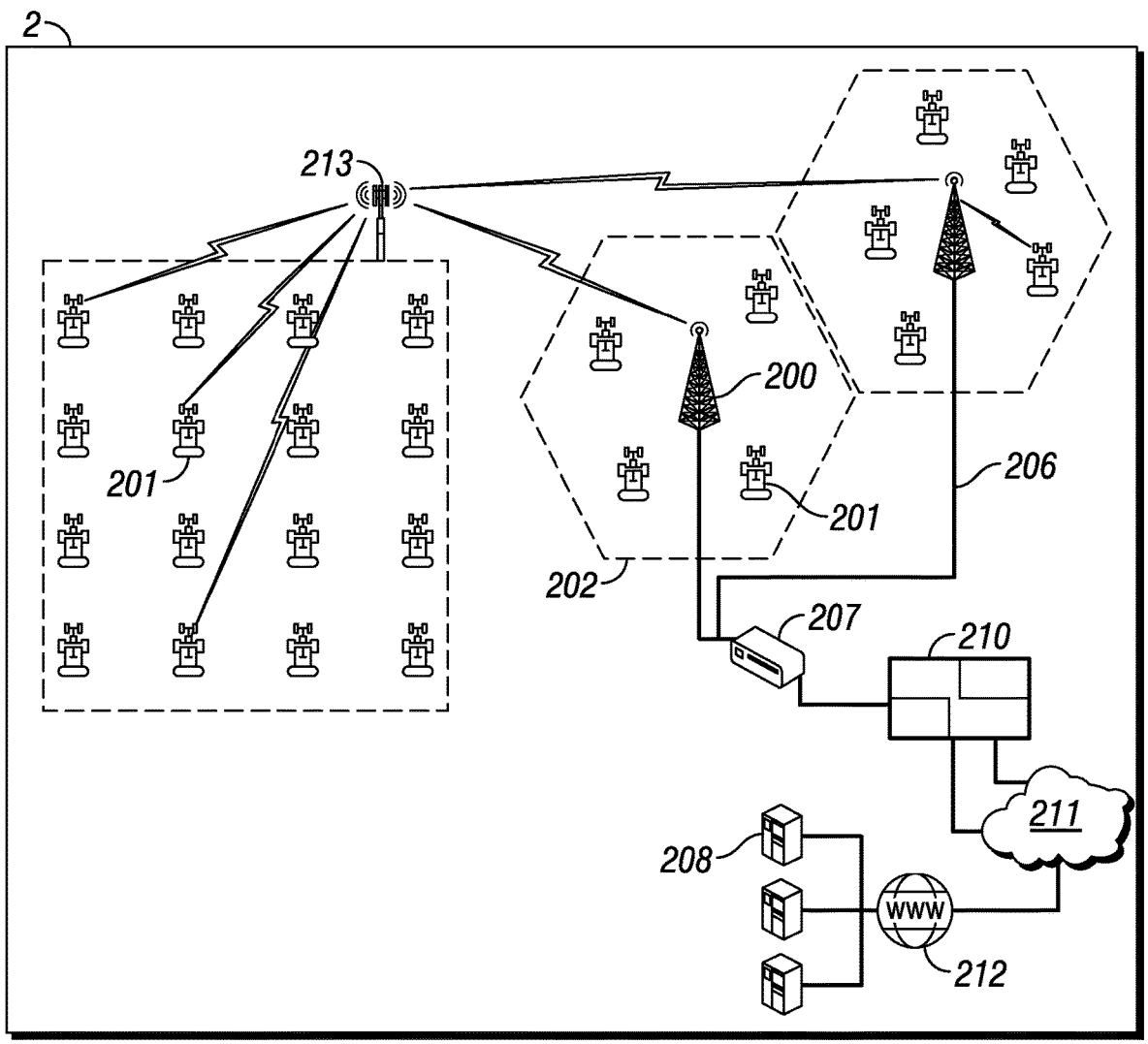

The seismic system 2 in FIG. 2 is of small-scale and mainly utilizing an existing cellular network including those wireless towers 200 each has a coverage area 202. In this example, relatively closely-spaced wireless seismic sensors 201 and an area of interest of about a mile squared are discussed. Each seismic sensor 201 may immediately communicate with a wireless tower 200 or with an intermediate Node-B or wireless mast 213 to reach a wireless tower 200 in the backhaul network.

Data from the seismic sensors 201 arriving at the wireless towers 200 follows the same path as explained for system 1 in FIG. 1 and all the decisions are made at the network side. In specific, the data are forward to the network side via fiber optic 206 to a fiber optic switching center 207 and then a main gateway 210. The data is then available on the Internet 212 via a network server 211 and accessible by application servers 208.

Note that due to small scale of the area of interest the required range of the wireless transmissions is relatively short. Thus, besides LPWAN which is particularly suitable for the large scale scenario explained with regard to seismic system 1, Wi-Fi or RF technologies such as Low-Power Wireless Personal Area Networks may also be used in seismic system 2.

Figure 3:
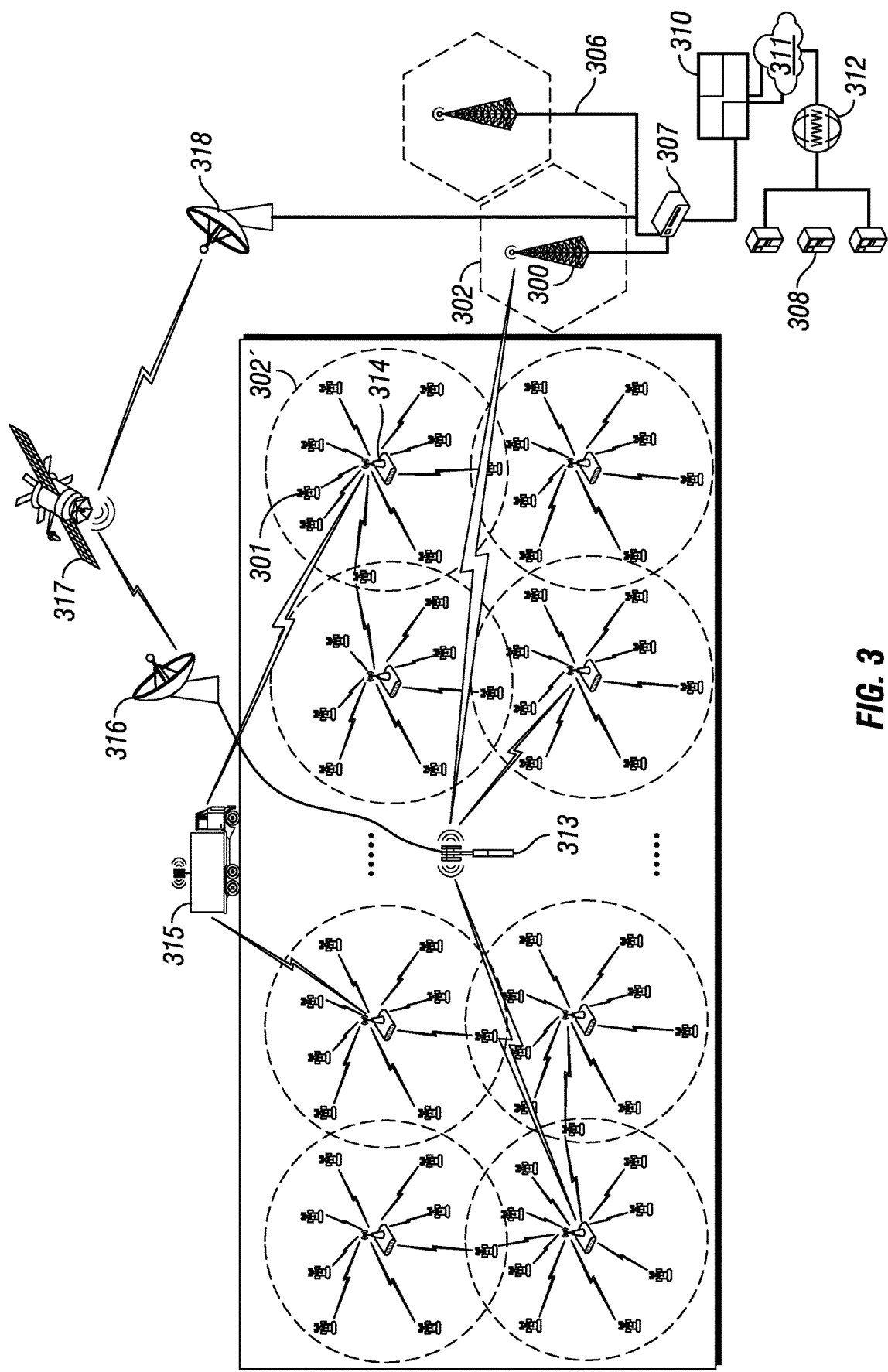

The seismic system 3 illustrated in FIG. 3 is more focused on establishing private networks. As depicted, groups of wireless seismic sensors 301 form sensor clusters around so-called data-gathering nodes 314 with higher capacities as opposed to cellular network-based systems such as the seismic systems 1 and 2. This system 3 is essentially devised to handle huge number of wireless seismic sensors spread over very large areas. The use of repeaters/concentrators imposes a limit on the capacity that can be handled per cluster, but also provides flexibility to make/apply decisions per cluster. Depending on the technology being employed, the size and area of each cluster may vary. The system 3 is supposed to be deployed far from an established cellular network infrastructure which mandates different ways of data aggregation and coordination. In the seismic system 3, the seismic sensors 30 first communicate with their respective cluster-heads 314 (also referred to as data-gathering nodes or concentrators).

Here we discuss three options for the uplink communications from the cluster-heads 314:

1) a data-recording truck 315 appropriately located next to or in the middle of the area in order to collect all the data from the cluster-heads 314. The downside is that if the truck 315 is not equipped with a satellite communication interface, the data cannot be available online in a real-time fashion;

2) establish a satellite communication link by for instance a satellite communication device 316 at the isolated area in order to transfer the data to a satellite 317 and then satellite sensor hubs 318 and from there on to the network server side via a fiber optic link to a fiber optic switching center 307;

3) put up extra intermediate wireless masts or Node-B's to tap into the wireless cellular network nearby, for instance the wireless towers 300. The rest of the path is the same as options 1) and 2).

This system 3 is flexible enough to handle transmission of both intermittent data and continuous data.

Figure 4:
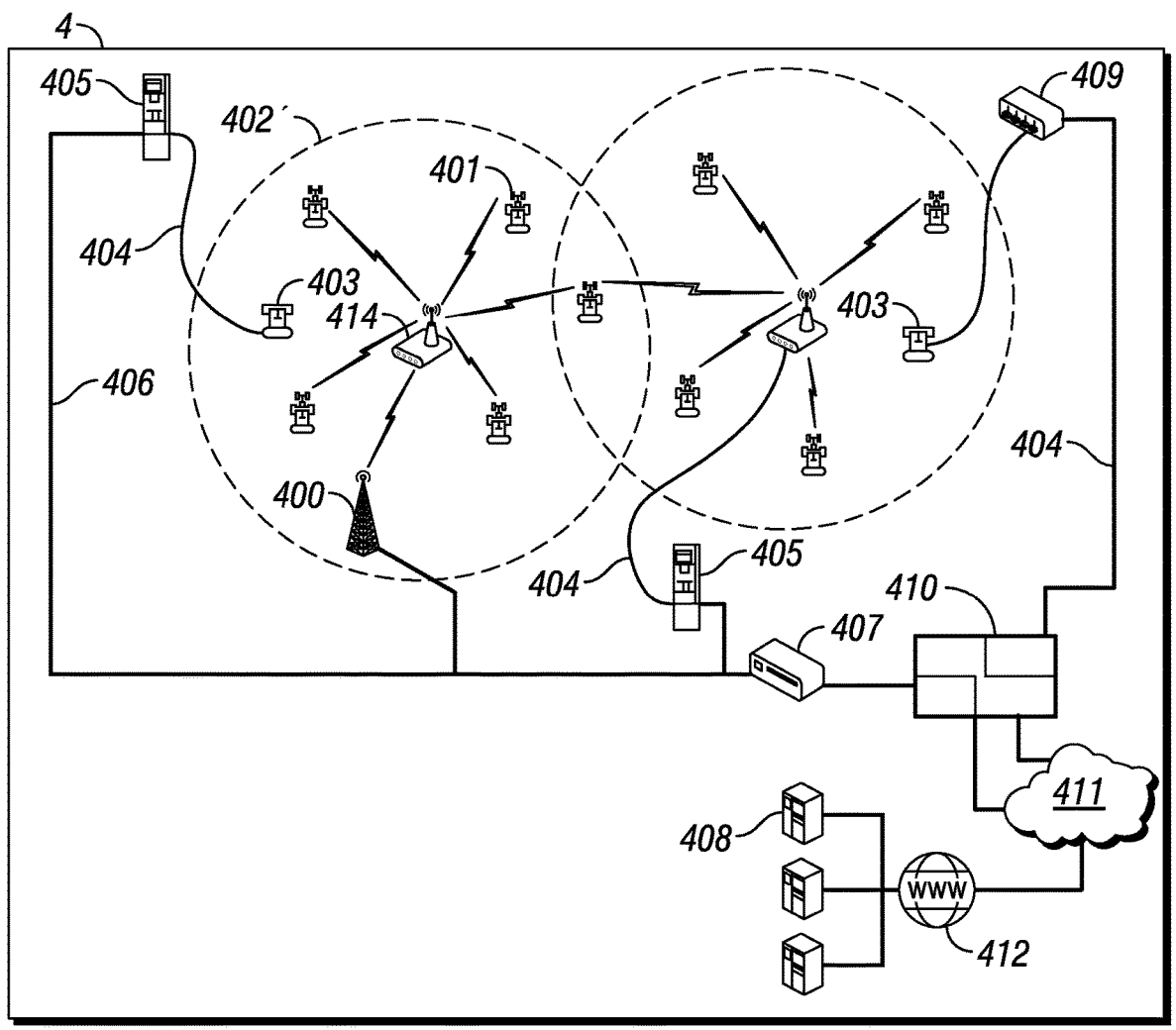

The seismic system 4 illustrated in FIG. 4 is a small-scale version of a hybrid private-cellular network. As illustrated, the system 4 comprises clusters 402' of seismic sensors 401 trying to connect to their cluster-heads 414. Each cluster 402' essentially creates a micro-scale private network. The cluster-heads 402 then exploit existing infrastructures (for instance HDSL, 3G/4G, etc.), with an emphasis on cellular backhaul, to forward their data to the network server side. This implies that such a network should be deployed in areas where cellular/wired network infrastructures already exist or can be extended to those regions with reasonable cost. The rest of the uplink path is similar to systems 1-3 explained earlier.

Cluster-heads 414 can function as intermediate decision making stage-gates. Comparing to system 3, the number of wireless seismic sensors 401 in system 4 is supposed to be orders of magnitude less with spacing of order of miles. This means LPWAN is of option.

Owing to the huge capacity and considerable flexibility of the cellular backhaul network, seismic system 1 can handle a wide variety of scenarios including GMM, ANSI, and MFM, except those executed in isolated areas where the cellular network coverage does not exist.

Seismic system 2, on the other hand, offers limited opportunities. It fits very well to small-scale monitoring applications where still large amount of data per sensor should be communicated. A good example among the four scenarios may be MFM.

Seismic system 3 can also be used for several applications in large-scale networks. Even though limited capacity of "affordable" private sub-networks in each cluster somewhat limits its potential for handling data. That is why system 3 is a good fit for QCLS among the four scenarios. It is flexible enough to be employed for ANSI as ambient noise data to be handled per sensor is not so large.

Seismic system 4 is flexible and can grow up to medium-level size and also can handle moderate levels of data per cluster if it taps into the cellular network backhaul or wired high speed Internet. It is the primary choice for GMM but also can be appropriately adjusted to handle MFM.

Table 2 shows a summary of the aforementioned network architecture designs. It can be seen that owing to the huge capacity and considerable flexibility of the cellular backhaul network, Architecture I shown in FIG. 1 can handle a wide variety of scenarios including GMM, ANSI, and MFM, except those executed in isolated areas where the cellular network coverage does not exist. As an example, QCLS is typically executed in the areas lacking an established network backbone, and thus does not seem to be a good fit.

Architecture II in FIG. 2, on the other hand, offers limited opportunities. It fits very well to small-scale monitoring applications where still large amount of data per node should be communicated. A good example among those four scenarios of interest is MFM.

Architecture III can also be used for several applications in large-scale networks. Even though limited capacity of "affordable" private sub-networks in each cluster somewhat limits its potential for handling data. That is why Architecture III is an excellent fit for QCLS among our scenarios of interest. It is flexible enough to be employed for ANSI as ambient noise data to be handled per node is not so large.

Architecture IV is a flexible one; it can grow up to medium-level size and also can handle moderate levels of data per cluster if it taps into the cellular network backhaul or wired high speed Internet. This is the primary architecture for GMM but also can be appropriately adjusted to handle MFM. Table 4.1 provides a summarizing look at the proposed architectures in this section.

TABLE 2

Network Architecture Design Summary

| Architecture | Area Covered | Suitable PHY Wireless Technologies | Applicable Scenarios |
| --- | --- | --- | --- |
| I: Cellular - Large See FIG. 1 | extremely large (100's of miles) | NB-IOT, EC-GSM, LTE-M, 4G, 5G | GMM, ANSI, MFM |
| II: Cellular - Small See FIG. 2 | medium (miles) | NB-IOT, EC-GSM, LTE-M, 4G, 5G, 6LoWPAN, (ext.) Wi-Fi | MFM |
| III: Hybrid - Large See FIG. 3 | large (10's of miles) | LoRa, (ext.) Wi-Fi, 6LoWPAN, NB-IoT | ANSI, QCLS |
| IV: Hybrid - Small See FIG. 4 | flexible (miles to 10's of miles) | LoRa, (ext.) Wi-Fi, 6LoWPAN, NB-IoT | GMM, MFM |

Figure 8:
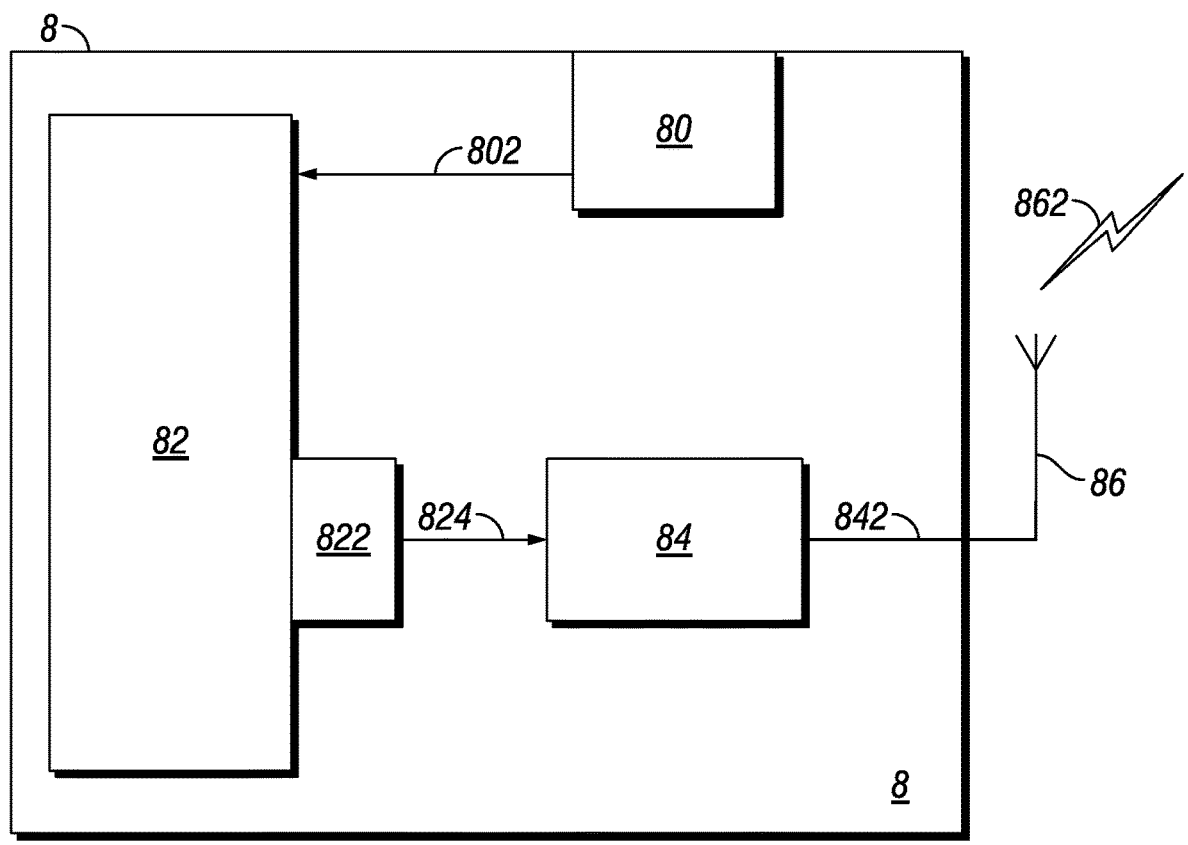
FIG. 8 depicts a block diagram of a seismic sensor for wireless seismic networking according to an embodiment of the present invention.

A seismic sensor with a wireless module is discussed in US Patent Application Publication No. 2008/0049554A1, which is incorporated herein with its entirety by reference. A seismic sensor according to certain embodiments of the invention may be formed according to FIG. 8. The seismic sensor 8 includes a sensor unit 80, which is capable of detecting a physical parameter of a seismic wave arriving at the sensor and generating an electric signal 802 reflecting that physical parameter. The main board 82 may include, by way of example, a processing unit, a memory, an analog-to-digital converter, a filter (not shown), etc. The electric signal 802 or other signal appropriately generated as required by the specific applications is processed by the main board 802 and an electric signal 824 will be passed to a LPWAN module 84 via an interface 822 on the main board 82. The LPWAN module 84 shall be designed/selected according to standards/protocols applied (for instance LoRa or NB-IoT) in order to generate a signal 842 suitable for wireless transmission via an antenna 86. The wireless signal sent via the antenna 86 is carrying data originally generated/received at the seismic sensor 8, which data may be seismic data or non-seismic data. The data may include intermittent data and/or continuous data.

A multi-objective network typically has to handle a complex data scheduling routine. In order to be general purpose and flexible, the network is supposed to handle transmission tasks of both intermittent data and continuous data simultaneously. These two different data types for each sensor seem to call for two different wireless technologies/transmission modes do not necessarily operate at the same time which will however result in undesirable complications.

The inventors of the present invention disclosure found it could be of particular benefit if a uniformed frame format can be designed for transmission of both continuous data and intermittent data from wireless seismic sensors.

Figure 5:
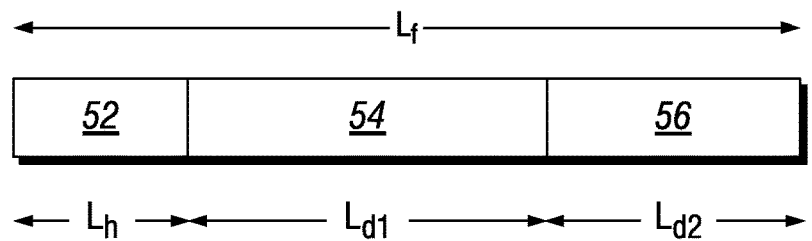
FIG. 5 depicts a frame structure for wireless transmission of both continuous data and intermittent data by a seismic sensor according to an embodiment of the invention.

FIG. 5 illustrates a frame structure for wireless transmission of both continuous data and intermittent data by a seismic sensor according to an embodiment of the invention. The wireless frame as illustrated is used for e.g. uplink communication in a seismic system illustrated in any one of FIGS. 1-4. The frame has a header 52, a first data section 54 and a second data section 56. The length of the whole frame is $L_f$, a length of the header 22 is $L_h$, a length of the first data section is $L_{d1}$ and a length of the second data section is $L_{d2}$.

Frame header 22 here basically refers to all the parts of an actual frame which contain no data but deal with other issues such as networking identifiers and addresses, synchronization flags, QC alert(s), GPS data, and possible error detection/correction data. In order to accommodate both data streams, two data sections are used. As will be further described later, the header 22 might include an indicator (1 bit would be enough) indicating whether the second data section 56 is used to carry continuous data or intermittent data. It should also be noted that several frames might be needed in order to fully transmit the intermittent data generated at one time.

The first data section 54 of the frame may be used to always send continuous data, and the content of the second data section 56 may be flexible: if there is intermittent data to be transmitted, for instance there is a new event triggering generation and transmission of intermittent data, or intermittent data generated by the latest trigger is not fully transmitted, the second data section 56 of the next frame may be used to transmit the (remained) intermittent data, if there is no intermittent data to be transmitted, which may be usually the case, the second data section of the next frame may be used to transmit additional continuous data. Thereby wireless resource (time and/or frequency) can be used more efficiently.

Another consideration in the frame structure design is the proportion between the bytes allocated to header and the data sections. This is typically quantified as frame/protocol efficiency and defined by the following equation:

$$\eta = \frac{data(payload)size}{total\ frame\ size} = \frac{L_{d1} + L_{d2}}{L_f} \quad (1)$$

where all the length values might be in bytes, looking at FIG. 5, it is clear that $$L_f = L_{d1} + L_{d2} + L_h \quad (2)$$

Preferably, η shall be kept above about 0.8 to ensure that a considerable portion of bandwidth is allocated to transmission of actual data. This may be also referred to as bandwidth-efficient transmission. In embodiments of the invention, the reason why the second data section 24 is not left empty even if there is no second type of data to be transmitted is to preserve bandwidth efficiency.

Figure 6:
FIG. 6 depicts an example of duty-cycled wireless transmission of data by a seismic sensor according to an embodiment of the present invention.

Power-saving strategies at the Media Access Control (MAC) level also impose other parameters which could be optimized. For different reasons including power efficiency in delay-tolerant applications as well as obeying certain channel occupancy restrictions, transceiver modules or machine-to-machine (M2M) devices do not continuously transmit data but based on a duty-cycle. This is shown in FIG. 6. FIG. 6 illustrates a duty-cycled transmission of frames in a seismic system according to an embodiment of the invention. As illustrated, transmission of frame #n−1 takes $t_f$, after then, the transmitter does not immediately start to send frame #n, instead, it waits for $t_{off}$, during which time period, the transmitter is in a stand-by mode with very low power consumption. This can be of particular benefit if the sensor is powered by a battery assembly and therefore sensitive to power consumption. Preferably, frames may have uniformed length, and periods between different pairs of frames may also be of the same length.

In this invention disclosure, duty cycle $\delta_c$ may be defined as:

$$\delta_c = \frac{t_f}{t_f + t_{off}} \quad (3)$$

To formulate the relation between the total delay (denoted by t) to transmit the full intermittent data generated at one time (denoted by $D_2$), the transmission bit rate (denoted by R), and data-splitting ratio defined as:

$$\rho_d = \frac{L_{d1}}{L_{d2}} = \frac{L_{d1} + L_{d2}}{L_{d2}} - 1 \quad (4)$$

Then required time-delay for each length is as below (all in seconds and factor 8 is for the conversion of bytes to bits):

$$t_{d1} = \frac{8L_{d1}}{R}, t_{d2} = \frac{8L_{d2}}{R}, t_f = \frac{8L_f}{R} \quad (5)$$

Therefore, γ full frames will be needed to transmit the whole D2 and is defined as follows:

$$\gamma = \left\lceil \frac{L_{D2}}{L_{d2}} \right\rceil = \left\lceil \frac{L_{D2}}{\eta_f L_f}(1 + \rho_d) \right\rceil \quad (6)$$

where ⌈.⌉ stands for ceiling operator.

In view of possible frame-error-rate in wireless communications, which should typically be kept as low as 0.01 to 0.05, one or more times of retransmission may be requested for those frames which are not correctly received. Assuming only one time of retransmission is needed in such a case, γ' frames will be needed to be sent to send out the whole D2:

$$\gamma' = \left\lceil \frac{L_{D2}}{L_{d2}} \right\rceil = \left\lceil \frac{L_{D2}}{\eta_f L_f}(1 + \rho_d)(1 + \lambda_f) \right\rceil \quad (7)$$

Therefore, the total delay to transmit $D_2$ can be given by $$t_{D2} \approx \gamma'(t_f + t_{off}) = \gamma'\left(\frac{8L_f}{\delta R}\right) \quad (8)$$

Finally, by substituting (7) into (8), R can be defined as:

$$\frac{8L_f}{\delta t}\left\lceil \frac{L_{D2}(1 + \rho_d)(1 + \lambda_f)}{\eta_f L_f} \right\rceil \quad (9)$$

Examining Equation (9) it is noticed that R is inversely proportional to $t_{D2}$, $\delta_c$ and $\eta_f$, and directly proportional to $\rho_d$ and $\lambda_f$. An appropriate R might meet the following criteria:

it should provide a reasonably short $t_{D2}$. So, these two parameters are entangled which might require iterations to meet the requirements. This is to ensure that D2 is already fully delivered before the next trigger.

it should not be orders of magnitude smaller than data generation rate of the continuous data. This is to ensure that the sensors do not require a very large buffer size.

it should fit into typical data-rates being offered by available PHY technologies in the industry.

Those skilled in the art would appreciate that FIGS. 5-6 are exemplary only, in practice, there might be seismic sensors configured to generate and transmit only one type of data (intermittent data or continuous data). In that particular case having only one type of data, a simpler frame structure which includes only one data section may be used.

Figure 7:
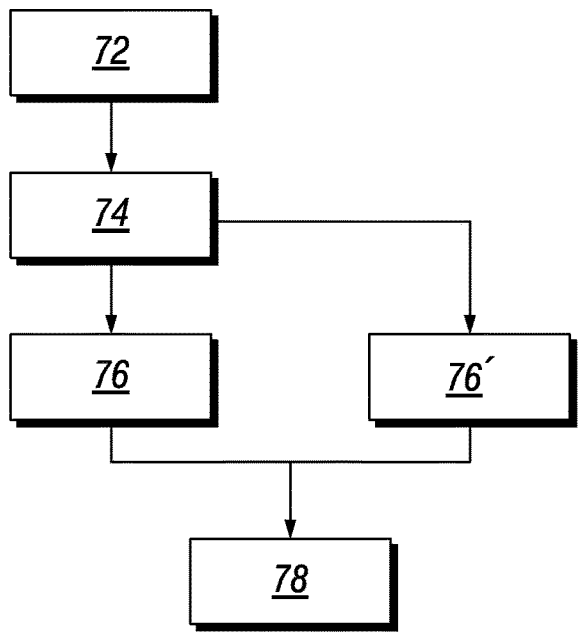
FIG. 7 depicts a flowchart of a method for wireless seismic networking according to an embodiment of the present invention.

FIG. 7 illustrates a flowchart of a method for wireless seismic networking according to a specific embodiment of the present invention. The method will be briefly discussed with reference to the seismic system 1 in FIG. 1 and the frame structure in FIG. 5. Similar processes will work in the seismic systems in FIGS. 2-4.

In step 72, seismic sensors 101 each having a LPWAN module are provided, for each sensor, the LPWAN module is configured for wireless transmission of data from that sensor. The data may include both continuous data and intermittent data.

In step 74, when transmitting a frame #n, at least one of the seismic sensors 101 use the first data section 54 of the frame to transmit continuous data to wireless tower 100.

With respect to the same frame #n, if there is any intermittent data to be transmitted, the seismic sensor 101 transmits, in step 76, the intermittent data to be transmitted using the second data section 56 of the frame #n.

If there is no such intermittent data to be transmitted when transmitting the frame #n, in step 76', additional continuous data is transmitted using the second data section of the frame #n. That is, the first data section 54 and the second data section 56 will be both assigned for transmitting data of the first type, e.g. continuous noise readings. By doing so, higher resource (e.g. time and/or frequency) efficiency may be achieved.

This dynamic assignment of the second data section 56 introduces some uncertainties, i.e. the receiving device e.g. a wireless tower 100 might not know which type of data is carried in the second data section of a frame. Therefore, in an embodiment, in step 78, an indicator is also sent in the header 52, indicating if the second data section 56 of the frame #n is used to transmit intermittent data or continuous data. This indicator might be implemented by a flag in the header 52. Without loss of generality, the indicator can be set to "0" standing for intermittent data, and "1" standing for continuous data.

In an alternative example, one frame might carry such indicators for the next a few frames.

In the method, frames may be formed according to FIG. 5 and transmitted in a duty-cycled way as illustrated in FIG. 6.

The present disclosure is not limited to the embodiments as described above and the appended claims. Many modifications are conceivable and features of respective embodiments may be combined. For instance, steps in the flowchart 7 may be executed in a different order or in parallel.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a core" includes a combination of two or more cores and reference to "a material" includes mixtures of materials.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

That which is claimed is:

1. A seismic sensor for wireless seismic networking, the seismic sensor comprising:
a wireless module for wireless transmission of continuous data and intermittent data from said seismic sensor, wherein the wireless module is configured to send intermittent data along with the continuous data using a plurality of frames, each frame comprising a header, a first data section and a second data section wherein:
the first data section of the frame is used to transmit continuous data;
the second data section of each frame has a flexible content wherein:
if there is intermittent data to be transmitted, the second data section of the frame is used to transmit the intermittent data;
if there is no intermittent data to be transmitted, the second data section of the frame is used to transmit additional continuous data.

2. The seismic sensor according to claim 1, wherein the wireless module is based on Long Range (LoRa) technology.

3. The seismic sensor according to claim 1, wherein the wireless module is based on NB-IoT technology.

4. The seismic sensor according to claim 1, wherein the wireless module is a low-power wide-area network (LP-WAN) module.

5. The seismic sensor according to claim 1, wherein the wireless module is further configured to transmit, in the header of each frame, an indicator indicating if the second data section of the frame is used to transmit the intermittent data or the continuous data.

6. The seismic sensor according to claim 1, wherein the frames are uniformed frames.

7. The seismic sensor according to claim 1, wherein the intermittent data is distributed over several frames.

8. A system for wireless seismic networking, the system comprising:
wireless network including wireless seismic sensors, wherein the wireless network is established for wireless transmission of data from the wireless seismic sensors, and wherein the each of the seismic sensors comprises:
a wireless module for wireless transmission of continuous data and intermittent data from said seismic sensor, wherein the wireless module is configured to send intermittent data along with the continuous data using a plurality of frames, each frame comprising a header, a first data section and a second data section wherein:
the first data section of the frame is used to transmit continuous data;
the second data section of each frame has a flexible content wherein:
if there is intermittent data to be transmitted, the second data section of the frame is used to transmit the intermittent data;
if there is no intermittent data to be transmitted, the second data section of the frame is used to transmit additional continuous data.

9. The system according to claim 8, wherein the wireless module is compatible with and connected to an existing wired or wireless backbone, and wherein the wired backbone includes fiber optic and/or DSL cables.

10. The system according to claim 8, wherein the wireless module is a low-power wide-area network (LPWAN) module.

11. A method for wireless seismic networking for surveying subterranean geological formations for hydrocarbon deposits by deploying seismic sources and seismic sensors, or detecting micro-seismic phenomena or earthquakes, the method comprising:
providing seismic sensors each having a wireless module, the wireless module being configured for wireless transmission of continuous data and intermittent data from the seismic sensor, and transmitting the continuous data and intermittent data using a plurality of frames, each frame comprising a header, a first data section and a second data section, wherein:
the first data section of each frame is used to transmit continuous data; and
the second data section of each frame has a flexible content wherein;
if there is intermittent data to be transmitted, the second data section of the frame is used to transmit the intermittent data; and
if there is no intermittent data to be transmitted, the second data section of the frame is used to transmit additional continuous data.

12. The method according to claim 11, wherein the wireless module is based on Long Range (LoRa) technology.

13. The method according to claim 11, wherein the wireless module is based on NB-IoT technology.

14. The method according to claim 11, wherein the wireless module is a low-power wide-area network (LP-WAN) module.

15. The method according to claim 11, further comprising performing the following step by the at least one of the seismic sensors:
transmitting, in the header of each frame, an indicator indicating if the second data section of the frame is used to transmit the intermittent data or the continuous data.

16. The method according to claim 11, wherein the frames are uniformed frames.

17. The method according to claim 11, wherein the intermittent data is distributed over several frames.

18. The method according to claim 11, wherein the wireless module is compatible with and connected to an existing wired backbone.

19. The method according to claim 18, wherein the wired backbone includes fiber optic and/or DSL cables.

* * * * *